(12) United States Patent
Wehr

(10) Patent No.: US 6,250,178 B1
(45) Date of Patent: Jun. 26, 2001

(54) ECCENTRIC MECHANISM WITH ADJUSTABLE STROKE

(75) Inventor: Hubert Wehr, Bornheim (DE)

(73) Assignee: Ch. Beha GmhB Technische Neuentwicklungen, Glotteral (DE)

( * ) Notice: Subject to any disclaimer, the term of this patent is extended or adjusted under 35 U.S.C. 154(b) by 0 days.

(21) Appl. No.: 09/356,455

(22) Filed: Jul. 19, 1999

(30) Foreign Application Priority Data

Jul. 20, 1998 (DE) .............................................. 198 32 511

(51) Int. Cl.[7] .................................................... G05G 1/00
(52) U.S. Cl. ...................................... 74/571 L; 74/571 M
(58) Field of Search ............................ 74/571 L, 571 M, 74/836

(56) References Cited

U.S. PATENT DOCUMENTS

| | | | |
|---|---|---|---|
| 3,180,178 | 4/1965 | Brown et al. | 74/600 |
| 3,554,846 | 1/1971 | Billett | 156/580 |

FOREIGN PATENT DOCUMENTS

| | | |
|---|---|---|
| 3441213 C1 | 2/1986 | (DE) . |
| 4226361 A1 | 4/1994 | (DE) . |

*Primary Examiner*—Dirk Wright
(74) *Attorney, Agent, or Firm*—Nath & Associates, PLLC; Gary M. Nath; Marvin C. Berkowitz

(57) ABSTRACT

In order to arrive at an eccentric mechanism which ensures that the eccentricity or the connecting rod stroke position is adjustable and after turning off the eccentric mechanism always is identical to the one before turning on the eccentric mechanism, the invention proposes that the cylinder shaped eccentric (16) of the eccentric shaft (10) is pivoted in the cylinder bore of an eccentric bush in a manner that ensures that when the eccentric mechanism is at a standstill concentricity is obtained when the eccentricities of the eccentric shaft and the cylinder bore of the eccentric bush cancel each other out while when the eccentric shaft (10) rotates due to the centrifugal force on at least one actuator (27) a counter-rotation of eccentric shaft and eccentric bush occurs automatically due to the centrifugal force while canceling the concentricity and the eccentricity becomes effective on the main drive pinion of the eccentric mechanism or vice versa.

5 Claims, 4 Drawing Sheets

ECCENTRIC MECHANISM WITH ADJUSTABLE STROKE

FIELD OF THE INVENTION

The invention describes an eccentric mechanism with an eccentric shaft whose cylinder shaped eccentric with eccentric bush carries out a circular motion when the eccentric shaft rotates and with this motion being translated into a reciprocating motion via a connecting rod, slide, etc.

BACKGROUND OF THE INVENTION

Customary eccentric mechanisms, crank mechanisms or cam mechanisms are used to translate a motion of rotation into a translational reciprocating motion or vice versa. Such mechanisms usually have a fixed stroke that corresponds to the eccentricity of the eccentric of the eccentric shaft/secondary shaft or the dimension of the crank of the crankshaft.

There also are crank mechanisms with adjustable strokes (HüTTE Taschenbuch für Betriebsingenieure, Band II Fertigungsmaschinen, Verlag von Wilhelm Ernst & Sohn, $6^{th}$ edition 1964, page 505). An adjustment bush with an eccentrically located bore is articulated on the eccentric, cylinder shaped crank pin of a so-called outside crankshaft and with the adjustment bush in turn being articulated on the connecting rod bearing of a connecting rod of a connecting rod press. By turning the adjustment bush on the crank pin, which can only be done when the press is at a standstill, the connecting rod stroke can be changed from a maximum size to a minimum size or vice versa.

However, there is a need especially for machines that work with an eccentric mechanism and a connecting rod stroke in which the stroke is adjustable during operation and in particular in a manner that ensures that the connecting rod stroke position after turning off the eccentric mechanism is identical to the one at the time of turning on the eccentric mechanism. A concrete example is the process of rotary friction welding of thermoplastic and elastic plastic materials. In these cases long profile belts with round or angular profiles, for example pentagonal profile sections, V-belt profile sections etc., made of such plastic material must be adjusted to finished size for the purpose of manufacturing such conveyor belts and then the ends of the profile belts must be welded by keeping one profile belt end in place while the other end of the belt is pressed against the stationary end of the belt and simultaneously is melted onto it via a translational reciprocating motion accompanied by the development of frictional heat. The same is true for the repair of such profile belts when they are torn. It is important that the ends of the belts are exactly aligned during the final welding process of the ends of the profile belts. Customary eccentric mechanisms whose connecting rods would provide the translational reciprocating motion of the end of one of the profile belts for the purpose of rotary friction welding cannot guarantee this because when such an eccentric mechanism or crank mechanism runs out, it arrives at its fixed eccentricity when at a standstill, which would not be desirable for the use of a friction welding device, for example.

SUMMARY OF THE INVENTION

The object of the invention is to provide an eccentric mechanism which guarantees that the eccentricity or the connecting rod stroke position is adjustable and that its position at the time when the eccentric mechanism is turned off is identical to its position at the time when the eccentric mechanism is turned on without requiring any elaborate measuring or automatic control engineering.

The object of the invention is attained with the features of the described in the appended claims.

The fact that in the eccentric mechanism in accordance with the invention the cylinder shaped eccentric of the eccentric shaft is pivoted in the cylinder bore of the eccentric bush in a manner that ensures that when the eccentric mechanism is at a standstill concentricity is obtained due to the fact that the eccentricities of eccentrics of the eccentric shaft and cylinder bore of the eccentric bush cancel each other out while during rotation of the eccentric shaft the centrifugal force on at least one actuator automatically causes a counter-torsion movement that is controlled by the centrifugal force between eccentric shaft and eccentric bush while canceling out the concentricity and the eccentricity acts on the main drive pinion of the eccentric mechanism, results in the fact that the eccentric system can be rotated automatically from a first position (neutral or start position) into a second position (working or operating position) in which the eccentric system has a pre-determined eccentricity and therefore a pre-determined connecting rod stroke at the main drive pinion which can be used for the side-head of a machine (tool), for example.

The stroke of the eccentric mechanism is automatically adjustable in that at least one actuator that rotates together with the eccentric mechanism moves due to the centrifugal force and acts on the eccentric shaft as well as on the eccentric bush and in that it causes components to counter-rotate with regard to each other by a certain angle and thus automatically changes or adjusts the eccentricities whereby once the eccentric mechanism is turned off and the centrifugal force on the actuator no longer exists, the change in eccentricity is cancelled by at least one readjusting spring. This ensures that when the eccentric mechanism in accordance with the invention is turned off, the position of the connecting rod stroke automatically always is identical to the one when the eccentric mechanism is turned on.

In accordance with another characteristic of the invention the eccentric shaft, in its peripheral area as well as the eccentric bush in its peripheral area, can have at least one tappet each in axial direction whereby the at least one actuator expands between the tappets due to the effects of the centrifugal force, spreads the tappets against the force of the readjusting spring and thus counter-rotates the eccentric shaft and eccentric bush with regard to each other.

The actuator that is controlled automatically by the centrifugal force can be a mass body in the form of a globe, for example, that moves freely in the annulus between the eccentric shaft and the tappets of the eccentric shaft and eccentric bush. The actuator that is controlled automatically by the centrifugal force also can be at least an arm of a lever, one end of which can be linked to a tappet of the eccentric shaft or eccentric bush and the other end of which swings out due to the centrifugal force, acts on the adjacent tappet of the eccentric bush or eccentric shaft, pushes the tappets apart and rotates the eccentric shaft and eccentric bush against the force of the readjusting springs.

The invention and its additional characteristics and advantages will be explained in more detail with the help of the schematically represented exemplary embodiment in the figures.

DETAILED DESCRIPTION OF THE INVENTION

Figure 1:
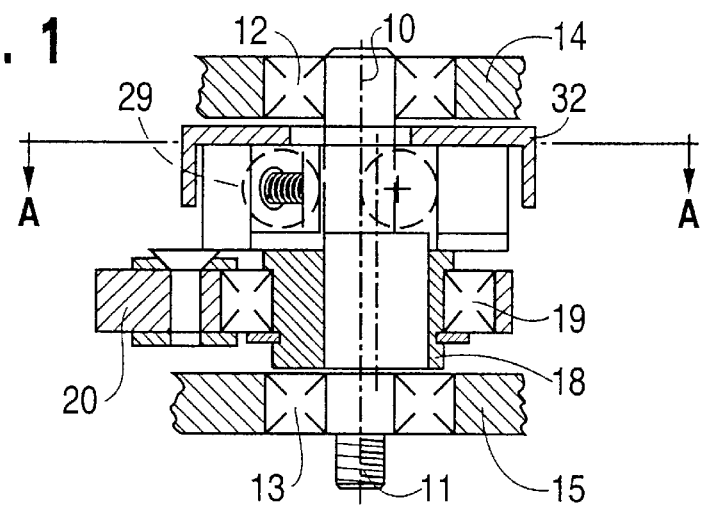
FIG. 1 shows an axial section of the eccentric mechanism in accordance with the invention, i.e. the section on a level that is located in the rotational axis.
Figure 4:
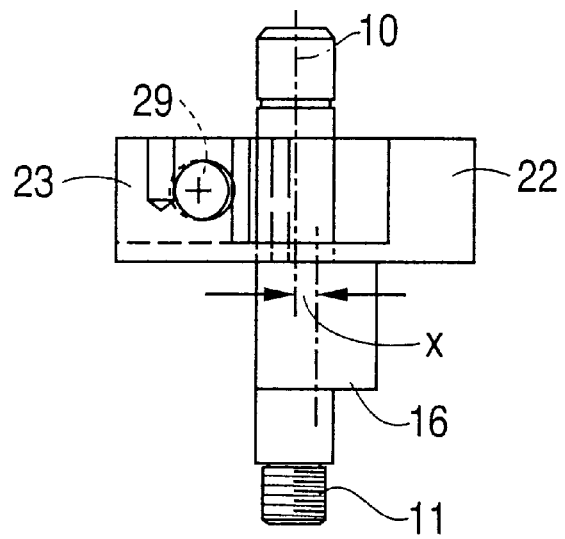
FIG. 4 shows a side-view of the eccentric shaft from FIG. 1
Figure 5:
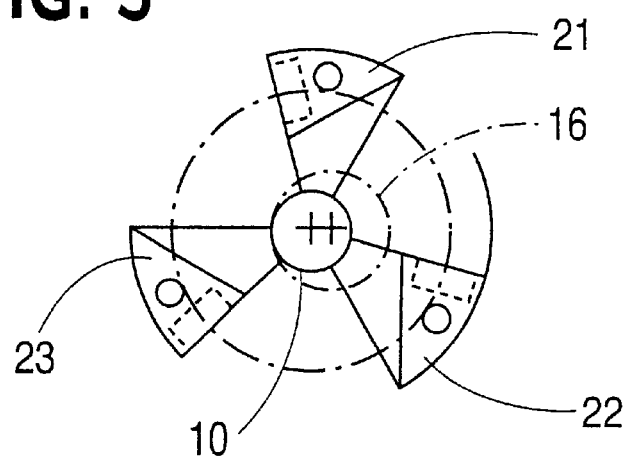
FIG. 5 shows a top view of the eccentric shaft in FIG. 4.
Figure 6:
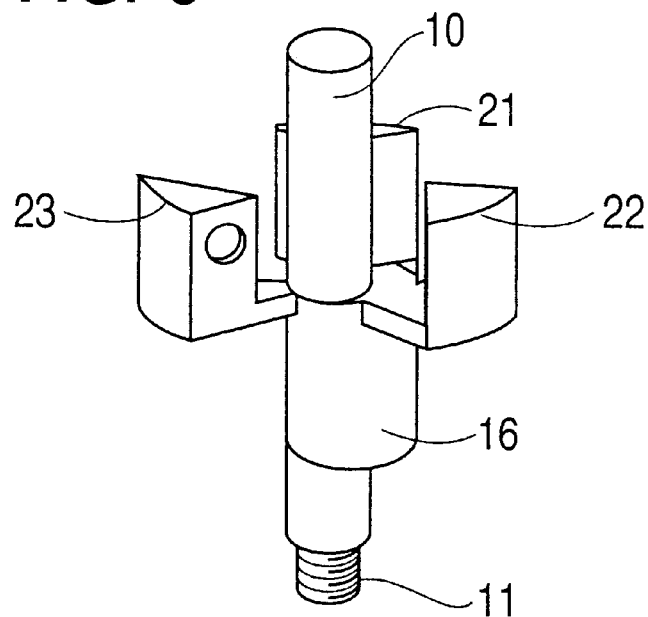
FIG. 6 shows an exploded view of the eccentric shaft of FIG. 4.
Figure 7:
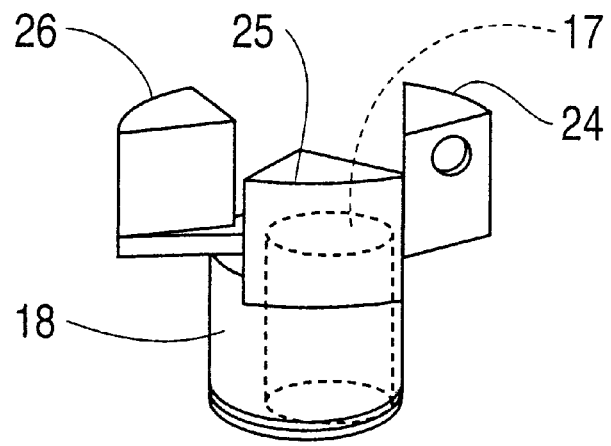
FIG. 7 shows the eccentric bush in FIG. 1, also an exploded view.
Figure 8:
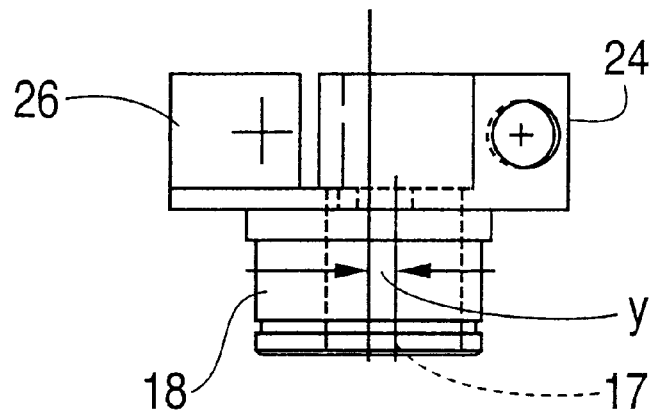
FIG. 8 shows a side-view of the eccentric bush of FIG. 7.
Figure 9:
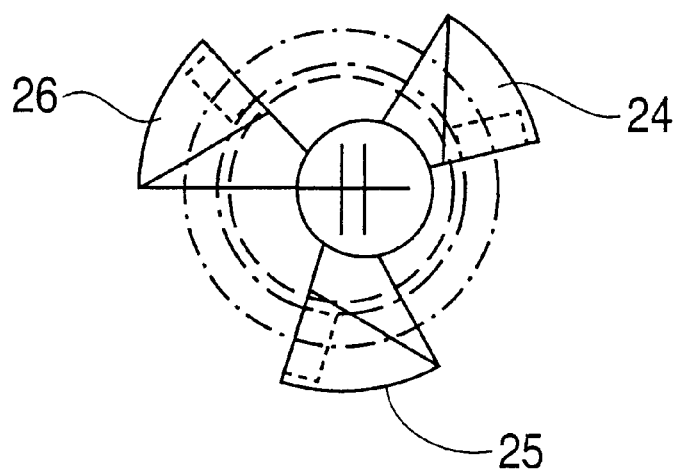
FIG. 9 shows a top view of the eccentric bush of FIG. 8.

FIG. 1 shows how the eccentric mechanism in accordance with the invention and its central eccentric shaft 10 that can be actuated by an electric motor via its actuation peg 11 and coupling, for example, pivots in a housing 14, 15 via bearings 12 and 13. FIGS. 4 and 6 clearly show that the eccentric shaft 10 has a cylinder shaped eccentric 16 whose eccentricity is marked x. FIGS. 6 through 8 clearly show that the cylinder shaped eccentric 16 of the eccentric shaft 10 pivots in a cylinder bore 17 of an eccentric bush 18. The eccentricity of the cylinder bore 17 is marked y in FIG. 8, whereby y=x. The eccentric bush 18 is arranged in the end area of a connecting rod 20 via connecting rod bearings 19 with the connecting rod being able to translate the rotating motion of the eccentric shaft 10 into a reciprocating stroke motion in a machine (tool), for example.

Figure 2:
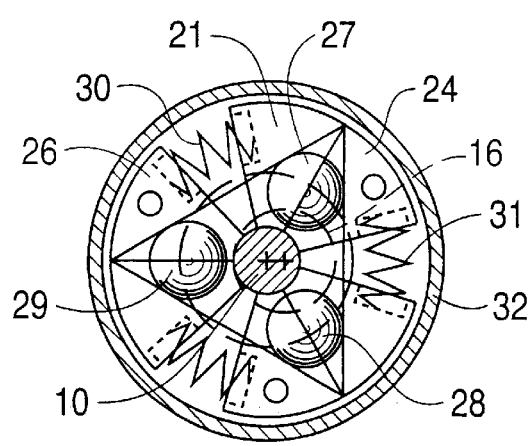
FIG. 2 shows a cross-section along line A—A in FIG. 1.
Figure 3:
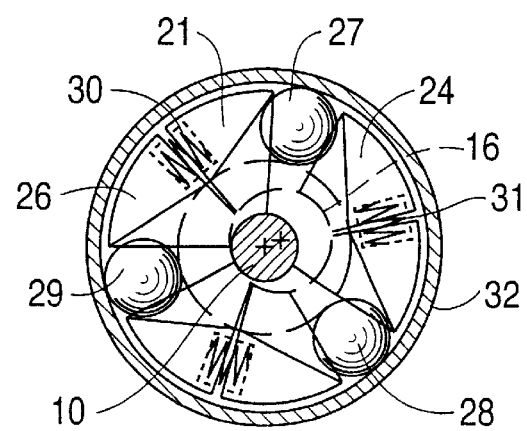
FIG. 3 shows the same cross-section through the eccentric mechanism as in FIG. 2; however, contrary to FIG. 2 it shows an operating position in which the actuators that are controlled by the centrifugal force are subjected to the centrifugal force.

In the exemplary embodiment in the drawings, as can be especially clearly seen in FIGS. 4 through 9, the eccentric shaft 10 has three tappets 21, 22, 23 arranged around the circumference in its peripheral area, for example, with the tappets running in axial direction. The eccentric shaft 18, too, has three tappets 24, 25, 26 in its peripheral area around its circumference in axial direction whereby the tappet 21 of the eccentric shaft 10, for example, rests between the adjacent tappets 24, 26 of the eccentric bush 18. In the area between the eccentric shaft 10 and all tappets there are three freely mobile globes 27, 28, 29 as mass bodies that are subjected to the centrifugal force when the eccentric mechanism rotates and that act as actuators as described in the following paragraphs:

FIG. 2 shows the eccentric mechanism in stop position, i.e. before the driving motor is turned on. In this standstill position the eccentric 16 of the eccentric shaft 10 is pivoted in the cylinder bore 17 of the eccentric bush 18 in a manner that ensures that the eccentricities x and y of the eccentric of the eccentric shaft and cylinder bore of the eccentric bush just cancel each other out in order to provide the exact concentricity of the system. After the driving motor of the eccentric mechanism is turned on, the globes 27, 28, 29 are cast to the periphery due to the centrifugal force and radially push to the outside against a working surface or spherical area of the tappets of the eccentric shaft and eccentric bush with these areas narrowing acutely towards the outside. FIGS. 2 and 3 show how globe 27, for example, spreads the tappet 21 of the eccentric shaft 10 and tappet 24 of the eccentric bush 18 against the force of readjusting springs 30, 31 and in the process counter-rotates the eccentric shaft 10 and the eccentric bush 18 while canceling out the original system concentricity (relative to each other) which causes the eccentricity on the main drive pinion of the eccentric mechanism, i.e. the stroke movement of the connecting rod 20, to become effective. After the driving motor of the eccentric mechanism in accordance with the invention is turned off, the exact concentricity of the eccentric system automatically is restored. In this process the eccentricity adjustment is completely automatic and is controlled by the centrifugal force as required by the invention, i.e. no elaborate measuring or automatic control engineering is required.

FIGS. 1 through 3 also show that tappets 21 through 23, 24 through 26 that are spaced along the circumference of eccentric shaft 10 and eccentric bush 18, are covered by an annular cap shaped housing cover 32.

The invention is not restricted to eccentric mechanisms but can also be applied to crank mechanisms, cam mechanisms etc. whose stroke or eccentricity is required to adjust automatically for certain areas of application.

What is claimed is:

1. An eccentric mechanism comprising:

an eccentric shaft having an eccentric shaped cylinder with an eccentric bush that carries out a circular motion when the eccentric shaft rotates, the circular motion being translatable into a reciprocating motion by a connecting rod and a slide wherein the eccentric shaped cylinder of the eccentric shaft is pivoted in a cylinder bore of the eccentric shaft in a manner that ensures that when the eccentric mechanism is at a standstill, the eccentricities (x, y) of the eccentric shaft and cylinder bore of the eccentric bush cancel each other out in order to obtain concentricity during the rotation of the eccentric shaft, while a centrifugal force acts on at least one actuator, automatically causing a counter-rotation between the eccentric shaft and the eccentric bush with regard to each other while canceling out the concentricity and while the eccentricity becomes effective on a main drive pinion of the eccentric mechanism or vice versa; and wherein the at least one actuator that rotates together with the eccentric mechanism acts on the eccentric shaft as well as on the eccentric bush due to the centrifugal force and counter-rotates these two components and their eccentricities with regard to each other; and the eccentric shaft and the eccentric bush each have a plurality of tappets in an axial direction in their respective peripheral areas whereby the actuator pushes the plurality of tappets apart due to the effect of the centrifugal force and thereby counter-rotates the eccentric shaft and eccentric bush relative to each other; and the at least one actuator is a globe that, due to the centrifugal force, pushes radially to an outside toward a working surface or a spherical area of the plurality of tappets of the eccentric shaft and the eccentric bush with these areas narrowing acutely towards the outside and pushes them against the force of a plurality of readjustment springs and thereby counter-rotates the eccentric shaft and the eccentric bush with regard to each other.

2. The eccentric mechanism in accordance with claim 1 wherein the actuators comprise a set of at least two globes whereby each of said globes, due to the centrifugal force, acts on a corresponding set of axial tappets of the eccentric shaft and the eccentric bush and rotate the tappets as well as the eccentric shaft and eccentric bush against the force of the plurality of readjustment springs.

3. The eccentric mechanism in accordance with claim 1 wherein the plurality of readjustment springs are helicoidal springs that are clamped between a side face of one of the plurality of tappets of the eccentric shaft and an opposite side face of an adjacent another of the plurality of tappets of the eccentric bush.

4. An eccentric mechanism comprising:

an eccentric shaft having an eccentric shared cylinder with an eccentric bush that carries out a circular motion when the eccentric shaft rotates, the circular motion being translatable into a reciprocating motion by a connecting rod and a slide wherein the eccentric shaped cylinder of the eccentric shaft is pivoted in a cylinder bore of the eccentric shaft in a manner that ensures that when the eccentric mechanism is at a standstill, the eccentricities (x, y) of the eccentric shaft and cylinder bore of the eccentric bush cancel each other out in order to obtain concentricity during the rotation of the eccentric shaft, while a centrifugal force acts on at least one actuator, automatically causing a counter-rotation between the eccentric shaft and the eccentric bush with regard to each other while canceling out the concentricity and while the eccentricity becomes effective on a main drive pinion of the eccentric mechanism or vice versa; and wherein the at least one actuator that rotates together with the eccentric mechanism acts on the eccentric shaft as well as on the eccentric bush due to the centrifugal force and counter-rotates these two components and their eccentricities with regard to each other; and the eccentric shaft and the eccentric bush each have a plurality of tappets in an axial direction in their respective peripheral areas whereby the actuator pushes the plurality of tappets apart due to the effect of the centrifugal force and thereby counter-rotates the eccentric shaft and eccentric bush relative to each other; and a first set of the plurality of tappets that are spaced along a circumference of the eccentric shaft as well as a second set of the plurality of tappets that are spaced in-between the first set of the plurality of tappets along a circumference of the eccentric bush are covered by an annular cap shaped housing cover.

5. An eccentric mechanism comprising:

an eccentric shaft having an eccentric shaped cylinder with an eccentric bush that carries out a circular motion when the eccentric shaft rotates, the circular motion being translatable into a reciprocating motion by a connecting rod and a slide wherein the eccentric shaped cylinder of the eccentric shaft is pivoted in a cylinder bore of the eccentric shaft in a manner that ensures that when the eccentric mechanism is at a standstill, the eccentricities (x, y) of the eccentric shaft and cylinder bore of the eccentric bush cancel each other out in order to obtain concentricity during the rotation of the eccentric shaft, while a centrifugal force acts on at least one actuator, automatically causing a counter-rotation between the eccentric shaft and the eccentric bush with regard to each other while canceling out the concentricity and while the eccentricity becomes effective on a main drive pinion of the eccentric mechanism or vice versa; and wherein the at least one actuator that rotates together with the eccentric mechanism acts on the eccentric shaft as well as on the eccentric bush due to the centrifugal force and counter-rotates these two components and their eccentricities with regard to each other; and the eccentric shaft and the eccentric bush each have a plurality of tappets in an axial direction in their respective peripheral areas whereby the actuator pushes the plurality of tappets apart due to the effect of the centrifugal force and thereby counter-rotates the eccentric shaft and eccentric bush relative to each other;

the at least one actuator is a lever arm having two ends, a first end pivots on a tappet of the eccentric shaft or eccentric bush and whose other end swings out due to the centrifugal force and acts on the other tappet of the eccentric bush or eccentric shaft, pushes the tappets apart and counter-rotates the eccentric shaft and eccentric bush with regard to each other against the force of readjustment springs; and wherein the plurality of readjustment springs are helicoidal springs that are clamped between a side face of one of the plurality of tappets of the eccentric shaft and an opposite side face of an adjacent another of the plurality of tappets of the eccentric bush.

\* \* \* \* \*

UNITED STATES PATENT AND TRADEMARK OFFICE
CERTIFICATE OF CORRECTION

PATENT NO. : 6,250,178 B1
DATED : June 26, 2001
INVENTOR(S) : Hubert Wehr

Page 1 of 1

It is certified that error appears in the above-identified patent and that said Letters Patent is hereby corrected as shown below:

Claim 4,
Line 2, "shared" should be -- shaped --

Signed and Sealed this

Fifteenth Day of January, 2002

Attest:

*Attesting Officer*

JAMES E. ROGAN
*Director of the United States Patent and Trademark Office*